United States Patent
Maki et al.

(10) Patent No.: US 7,366,149 B2
(45) Date of Patent: Apr. 29, 2008

(54) WEB-CONTENTS RECEIVING SYSTEM AND APPARATUS FOR PROVIDING AN ACCESS POINT

(75) Inventors: Makoto Maki, Nagoya (JP); Takashi Ishidoshiro, Nagoya (JP)

(73) Assignee: Buffalo Inc., Nagoya (JP)

( * ) Notice: Subject to any disclaimer, the term of this patent is extended or adjusted under 35 U.S.C. 154(b) by 806 days.

(21) Appl. No.: 10/615,285

(22) Filed: Jul. 7, 2003

(65) Prior Publication Data

US 2004/0095916 A1 May 20, 2004

Related U.S. Application Data

(60) Provisional application No. 60/427,735, filed on Nov. 19, 2002.

(30) Foreign Application Priority Data

Dec. 5, 2002 (JP) .............................. 2002-353628

(51) Int. Cl.
*H04Q 7/24* (2006.01)
*G06F 15/173* (2006.01)
(52) U.S. Cl. ...................... 370/338; 709/223; 709/226
(58) Field of Classification Search ................ 455/466, 455/439, 41, 445; 370/338; 705/1, 26, 219; 709/219, 246
See application file for complete search history.

(56) References Cited

U.S. PATENT DOCUMENTS

| | | | |
|---|---|---|---|
| 6,112,099 A * | 8/2000 | Ketola ......................... | 455/466 |
| 6,363,351 B1 * | 3/2002 | Moro ............................. | 705/1 |
| 2002/0022453 A1 * | 2/2002 | Balog et al. ................... | 455/41 |
| 2002/0022483 A1 * | 2/2002 | Thompson et al. ........... | 455/439 |
| 2002/0062361 A1 * | 5/2002 | Kivipuro et al. ............. | 709/219 |
| 2002/0065730 A1 * | 5/2002 | Nii ............................... | 705/26 |

(Continued)

FOREIGN PATENT DOCUMENTS

EP 1 139 635 10/2001

(Continued)

OTHER PUBLICATIONS

European Search Report from European Patent Application No. EP 03254833, dated Jun. 15, 2007, 4 pages.

*Primary Examiner*—Joseph Feild
*Assistant Examiner*—Kiet Doan
(74) *Attorney, Agent, or Firm*—Beyer Law Group LLP

(57) ABSTRACT

The system of the present invention enables a user moving with a terminal to utilize multiple access points located at mutually separate spots and thereby efficiently acquire a desired Web content. The user of a terminal 50 or 60 moves from one free spot (first communication area AR1) to another free spot (second communication area AR2). Prior to the movement, the user of the terminal 50 or 60 gains off-line access to an access point 20 in the first communication area AR1 and reserves acquisition of a desired Web content. The access point 20 accepts the reservation and transmits reservation information to another access point 120 in the second communication area AR2. The access point 120 gains on-line access to a Web server based on the received reservation information and acquires the reserved Web content. After the move, the user of the terminal 50 or 60 gains off-line access to the access point 120 and picks up the desired Web content.

8 Claims, 4 Drawing Sheets

U.S. PATENT DOCUMENTS

2002/0068573 A1    6/2002    Raverdy et al.
2003/0119527 A1*   6/2003    Labun et al. ............... 455/456

FOREIGN PATENT DOCUMENTS

| EP | 1 260 791 | 11/2002 |
| EP | 1 278 127 | 1/2003 |
| JP | 2000-163685 | 6/2000 |
| JP | 2002-039770 | 2/2002 |
| WO | 01/73569 | 10/2001 |
| WO | 01/76120 | 10/2001 |
| WO | 02/31441 | 4/2002 |

* cited by examiner

WEB-CONTENTS RECEIVING SYSTEM AND APPARATUS FOR PROVIDING AN ACCESS POINT

This application claims priority of U.S. Provisional Patent Application No. 60/427,735, filed Nov. 19, 2002 entitled "Web-Contents Receiving System And Apparatus for Providing An Access Point," which is hereby incorporated by reference.

BACKGROUND OF THE INVENTION

1. Field of the Invention

The present invention relates to a content reservation and pickup technique of reserving acquisition of a content via the Internet through an access from a predetermined terminal to one access point and picking up the reserved content through an access from the predetermined terminal to another access point located apart from the one access point.

2. Description of the Related Art

Access points as radio relay stations for a wireless LAN are used as the device of connecting multiple computers at separate locations to the Internet not only in the places where specific people continuously act, such as homes and offices (hereafter referred to as private spaces), but in the places where general public temporarily act, such as hotels, airports, shopping malls, parks, and stations (hereafter referred to as public spaces). One proposed technique connects an access point located in a public space with a broadband line, which ensures high-speed Internet access services, such as an xDSL line or a CATV line, and gives a space for Internet access to the general public in a coverage of radio wave transmitted from the access point (radio communication area). For example, non-patent reference 'What is Freespot?' (on-line text), dated Jul. 2, 2002, URL: http://www.freespot.net/index.html by FREESPOT Association) describes the concept of the space. This space is called as a free spot The administrator of the public space is authorized to use a certain broadband line. The broadband line is open to terminals possessed by the respective users of the public space via the access point for the wireless LAN. This enhances the convenience of the user's Internet access and increases the utilization rate of the public space.

The prior art technique, however, takes a rather long time, especially in the case of large data, to pick up a desired content or desired data after connection to the Internet. The user should accordingly stay at one free spot until completion of download of the desired content or data. This is inconvenient to the user who is traveling.

For example, it is assumed that the user who waits for a train at a station having the function of a free spot establishes connection with the Internet via an access point at the station to acquire a desired content. The user may, however, not complete download of the desired content prior to boarding, if the train is coming soon or if the desired content has a large volume. In order to complete the download, the user is accordingly forced to stay at the station with an unintentional delay in the schedule.

The download time of a content at a free spot via the Internet depends upon the traffic of a broadband line open to general public. It is accordingly difficult for the user to estimate the download time. The user may estimate that there is a sufficient time before arrival of the train and establish connection with the Internet. The transfer rate of data is, however, relatively low beyond expectation, and the download may not be completed before arrival of the train.

SUMMARY OF THE INVENTION

The object of the present invention is thus to enable a user, who moves with a terminal, to utilize multiple access points located at mutually separate spots and thereby efficiently acquire desired contents and data.

In order to attain at least part of the above and the other related objects, the present invention is directed to a content reservation and pickup system, where multiple access points as radio relay stations for a wireless LAN are located at multiple spots that are mutually apart from each other, and a radio communication area of each access point is established in a coverage of radio wave transmitted from the access point, in said content reservation and pickup system, when a terminal enters a radio communication area of a first access point which is one of said multiple access points, said terminal gains access to said first access point to reserve acquisition of a selected content via the Internet, after the reservation, a terminal gains access to the second access point to pick up the reserved content.

The first access point comprising: an input module that inputs content identification information for identifying the selected content for pickup, location specification information for specifying a location outside the radio communication area of said first access point as a pickup location of the selected content, and receiver identification information for identifying a person who picks up the selected content, through an access from said terminal entering the radio communication area of first access point; a specification module that retrieves a radio communication area including the location specified by the input location specification information and specifies an access point that covers the retrieved radio communication area as an second access point; and an information transmission module that maps the input receiver identification information to information on the selected content for pickup and transmits the mapped information to said specified second access point via the Internet.

The second access point comprising: a storage module that stores the selected content for pickup, which is acquired through an access to a Web server on the Internet based on the content identification information and is mapped to the receiver identification information; an authentication module that requests input of the receiver identification information in response to an access from any terminal, and authenticates the access when the input receiver identification information is identical with the stored receiver identification information; and a content transmission module that transmits the selected content, which is stored as mapped to the receiver identification information, to said terminal authenticated by said authentication module.

In the content reservation and pickup system of the present invention, when a terminal enters the radio communication area of first access point, the terminal gains access to the first access point and reserves acquisition of a selected content via the Internet. The reservation is made according to the following procedure. The first access point receives from the terminal, the content identification information for identifying the selected content for pickup, the location specification information for specifying the pickup location of the selected content, and the receiver identification information for identifying the person who picks up the selected content. The first access point maps the input receiver identification information to the information on the selected content for pickup and transmits the mapped information via the Internet to the second access point, which is specified by the location specification information. The object access point then receives the transmitted information. The content may be a text, an image, a sound, a moving picture, or a combination thereof. The content selected for pickup may be a Web content located on a Web server or a general file received via a network according to a protocol like an FTP. The 'information on the selected content' maybe the content identification information, such as a URL of the content, or any other data representing the details of the content.

The selected content for pickup is then acquired through an access to a Web server on the Internet, based on the content identification information. Either the first access point or the second access point may have access to the Web server. In the former case, the first access point acquires the selected content, maps data representing the details of the content to the receiver identification information, and transmits the mapped data to the second access point. In the latter case, on the other hand, the second access point gains access to the Web server on the Internet, based on the content identification information received from the first access point, and acquires the selected content for pickup, prior to a movement of the terminal into the radio communication area of the second access point. The latter procedure does not require transmission of the data representing the details of the content from the first access point to the second access point. This desirably reduces the traffic of the line for the Internet.

The second access point then stores the acquired content mapped to the receiver identification information. The details of the reserved content are thus registered. When the terminal enters the radio communication area of the second access point and gains access to the second access point, the second access point requests input of the receiver identification information, and authenticates the access when the input receiver identification information is identical with the stored receiver identification information. The second access point transmits the selected content, which is stored as mapped to the receiver identification information, to the terminal, when the access is authenticated.

The user of the terminal is planned to move from the radio communication area of a first access point to the radio communication area of a second access point. Prior to the movement, the user gains off-line access (in the state of no connection with the Internet) from the terminal to the first access point and reserves acquisition of a desired content. After the reservation, the access point gains on-line access (in the state of connection with the Internet) to the Web server to automatically acquire the reserved content. The user picks up the desired content through an off-line access to the second access point. This arrangement enables the user to pick up a desired content at a desired location in a short download time, regardless of the traffic of the line. The pickup is allowed under the condition of the authentication based on the receiver identification information input at the time of reservation. This arrangement effectively prevents the reserved content for pickup from being accessed illegally by any third person and ensures the sufficient security.

In the content reservation and pickup system of the present invention, the input module may input hardware inherent information for identifying the terminal that picks up the content, instead of the receiver identification information. This arrangement enables the user with the terminal used for the reservation to pick up the data representing the details of the selected content, thereby ensuring consolidation of the data.

The present invention is also directed to an access point as a radio relay station for a wireless LAN that transmits radio wave of a predetermined frequency and, when a terminal enters a radio communication area established in a coverage of the transmitted radio wave, connects said terminal to the Internet in response to a predetermined instruction from said terminal.

The access point has means for accepting a reservation for acquiring a selected content via the Internet from the terminal and means for providing the terminal with the reserved content.

The access point comprising: an input module that inputs content identification information for identifying the selected content for pickup and receiver identification information for identifying a receiver who picks up the selected content, through an access from said terminal entering the radio communication area; an information transmission module that accepts reservation of the selected content for pickup in response to input by said input module, and transmits the input content identification information and receiver identification information to another access point via the Internet; an acquisition module that, in response to input of the content identification information and the receiver identification information transmitted from another access point, gains access to a Web server on the Internet to acquire the reserved content for pickup based on the input content identification information; a storage module that stores the acquired content, which is mapped to the receiver identification information; an authentication module that requests input of the receiver identification information in response to an access from any terminal entering the radio communication area, and authenticates the access when the input receiver identification information is identical with the stored receiver identification information; and a content transmission module that transmits the selected content, which is stored as mapped to the receiver identification information, to said terminal authenticated by said authentication module.

The access point of the present invention accepts reservation for acquiring a selected content, which is sent via the Internet from the terminal entering the radio communication area, according to the following procedure. The access point accepts reservation of the selected content for pickup under the condition of input of the content identification information and the receiver identification information. The access point then transmits the content identification information and the receiver identification information to another access point via the Internet. The access point also provides the terminal with the reserved content for pickup according to the following procedure. The access point gains access to the Web server on the Internet, based on the content identification information received from another access point, acquires the reserved content for pickup, and stores the acquired content mapped to the receiver identification information received from the another access point. After the storage, in response to an access from a terminal entering its radio communication area, the access point requests input of the receiver identification information and authenticates the access when the input receiver identification information is identical with the stored receiver identification information. The access point transmits the selected content, which is stored as mapped to the receiver identification information, to the terminal, when the access is authenticated.

The access point of the present invention accepts reservation for acquiring a desired content through an off-line access from the terminal entering its radio communication area. The access point also provides the terminal with the content reserved by the terminal in another radio communication area through an off-line access from the terminal entering its radio communication area. This arrangement enables the terminal to pick up a reserved content at a location, which is different from the location of the reservation, in a short download time, regardless of the traffic of the line. The pickup is allowed under the condition of the authentication based on the receiver identification information input at the time of reservation. This arrangement effectively prevents the reserved content for pickup from being accessed illegally by any third person and ensures the sufficient security.

The present invention is further directed to a content reservation and pickup method that locates multiple access points as radio relay stations for a wireless LAN at a first spot and a second spot that are mutually apart from each other. When a terminal enters a first radio communication area, which is a coverage of radio wave transmitted from a first access point located at the first spot, the method allows access from the terminal to the first access point to reserve acquisition of a selected content via the Internet. When the terminal enters a second radio communication area, which is a coverage of radio wave transmitted from a second access point located at the second spot after the reservation, the method allows access from the terminal to the second access point to pick up the reserved content.

The content reservation and pickup method includes the steps of: allowing access from the terminal entering the first radio communication area to the first access point, so as to input content identification information for identifying the selected content for pickup, location specification information for specifying a location in the second radio communication area as a pickup location of the selected content, and receiver identification information for identifying a person who picks up the selected content; causing either of the first access point and the second access point to gain access to a Web server on the Internet and acquire the selected content for pickup, based on the input content identification information; causing the second access point to store the acquired content, which is mapped to the receiver identification information; requesting input of the receiver identification information in response to an access from the terminal entering the second radio communication area to the second access point after the storage, and authenticating the access when the input receiver identification information is identical with the stored receiver identification information; and transmitting the selected content, which is stored as mapped to the receiver identification information, to the terminal, when the access is authenticated.

When the terminal enters the first radio communication area, the content reservation and pickup method of the present invention allows access from the terminal to the first access point to reserve acquisition of a selected content via the Internet. The method receives from the terminal accessing the first access point, the content identification information, the location specification information for specifying a location in the second radio communication area as a pickup location of the selected content, and the receiver identification information. Either the first access point or the second access point gains access to the Web server on the Internet, based on the input content identification information to acquire the selected content. The second access point stores the acquired content mapped to the receiver identification information. After the storage, in response to an access from the terminal entering the second radio communication area to the second access point, the method requests input of the receiver identification information and authenticates the access when the input receiver identification information is identical with the stored receiver identification information. The method transmits the selected content, which is stored as mapped to the receiver identification information, to the terminal, when the access is authenticated.

The user of the terminal is planned to move from the first radio communication area to the second radio communication area. Prior to the movement, the user gains off-line access from the terminal to the first access point and reserves acquisition of a desired content. The user picks up the reserved content through an off-line access to the second access point after the movement. This arrangement enables the user to pick up a desired content at a desired location in a short download time, regardless of the traffic of the line. The pickup is allowed under the condition of the authentication based on the receiver identification information input at the time of reservation. This arrangement effectively prevents the reserved content for pickup from being accessed illegally by any third person and ensures the sufficient security.

The present invention is also directed to a data pickup system, where multiple access points as radio relay stations for a wireless LAN are located at multiple spots that are mutually apart from each other, and a radio communication area of each access point is established in a coverage of radio wave transmitted from the access point.

In the data pickup system, when a terminal enters a radio communication area of one access point, the terminal gains access to the one access point to set a storage space for data acquired via a communication line, in a memory device connecting with another access point, which is different from the one access point. When the terminal enters a radio communication area of the another access point after the setting, after the reservation, the terminal gains access to the another access point to pick up the data stored in the storage space.

The one access point includes: an input module that inputs location specification information for specifying a location outside the radio communication area of the one access point as a pickup location of the data and receiver identification information for identifying a person who picks up the data, through an access from the terminal entering the radio communication area of the one access point; a specification module that retrieves a radio communication area including the location specified by the input location specification information and specifies an access point that covers the retrieved radio communication area as an object access point; and an information transmission module that transmits the input receiver identification information to the specified object access point.

The object access point includes: a storage space setting module that sets a storage space to store the receiver identification information and data mapped to the receiver identification information and acquired via the communication line, in a memory device connecting with the object access point; an authentication module that requests input of the receiver identification information in response to an access from the terminal, and authenticates the access when the input receiver identification information is identical with the stored receiver identification information; and a data transmission module that transmits the data, which is stored in the storage space as mapped to the receiver identification information, to the terminal, when the access is authenticated by the authentication module.

When the terminal enters the radio communication area of one access point, the data pickup system of the present invention allows access from the terminal to the one access point, in order to set the storage space for data acquired via the communication line, in the memory device connecting with another access point, which is different from the one access point. The storage space is set according to the following procedure. The one access point receives the location specification information for specifying the location outside its radio communication area as a pickup location of the data and the receiver identification information from the terminal accessing the one access point, and sends the input receiver identification information to the object access point specified by the input location specification information. The object access point receives the receiver identification information, stores the receiver identification information in the memory device connecting with the object access point, and sets the storage space for data acquired via the communication line and mapped to the receiver identification information. After setting of the storage space, in response to an access from the terminal to the object access point, the system requests input of the receiver identification information and authenticates the access when the input receiver identification information is identical with the stored receiver identification information. The system transmits the data, which is mapped to the receiver identification information and is stored in the storage space, to the terminal, when the access is authenticated.

The user of the terminal is planned to move from the radio communication area of one access point to the radio communication area of an object access point. Prior to the movement, the user gains off-line access from the terminal to the one access point and sets the storage space for data acquired via the communication line, in the memory device connecting with the object access point. The user receives the data stored in the storage space through an off-line access to the object access point after the movement. This arrangement enables the user to pick up required data at a desired location in a short download time, regardless of the traffic of the line. The pickup is allowed under the condition of the authentication based on the receiver identification information input at the time of reservation. This arrangement effectively prevents the data stored in the storage space from being accessed illegally by any third person and ensures the sufficient security.

The above and other objects, features, aspects, and advantages of the present invention will become more apparent from the following detailed description of the preferred embodiment with the accompanying drawings.

DESCRIPTION OF THE PREFERRED EMBODIMENTS

One mode of carrying out the present invention is discussed below in the following sequence:

A. Embodiment (Web Content Reservation and Pickup System KH)

A-1. General Construction of Web Content Reservation and Pickup System KH

A-2. Series of Processing Executed by Access Points 20 and 120

A-3. Functions and Effects

B. Modified Examples

A. Embodiment

A-1. General Construction of Web Content Reservation and Pickup System KH

Figure 1:
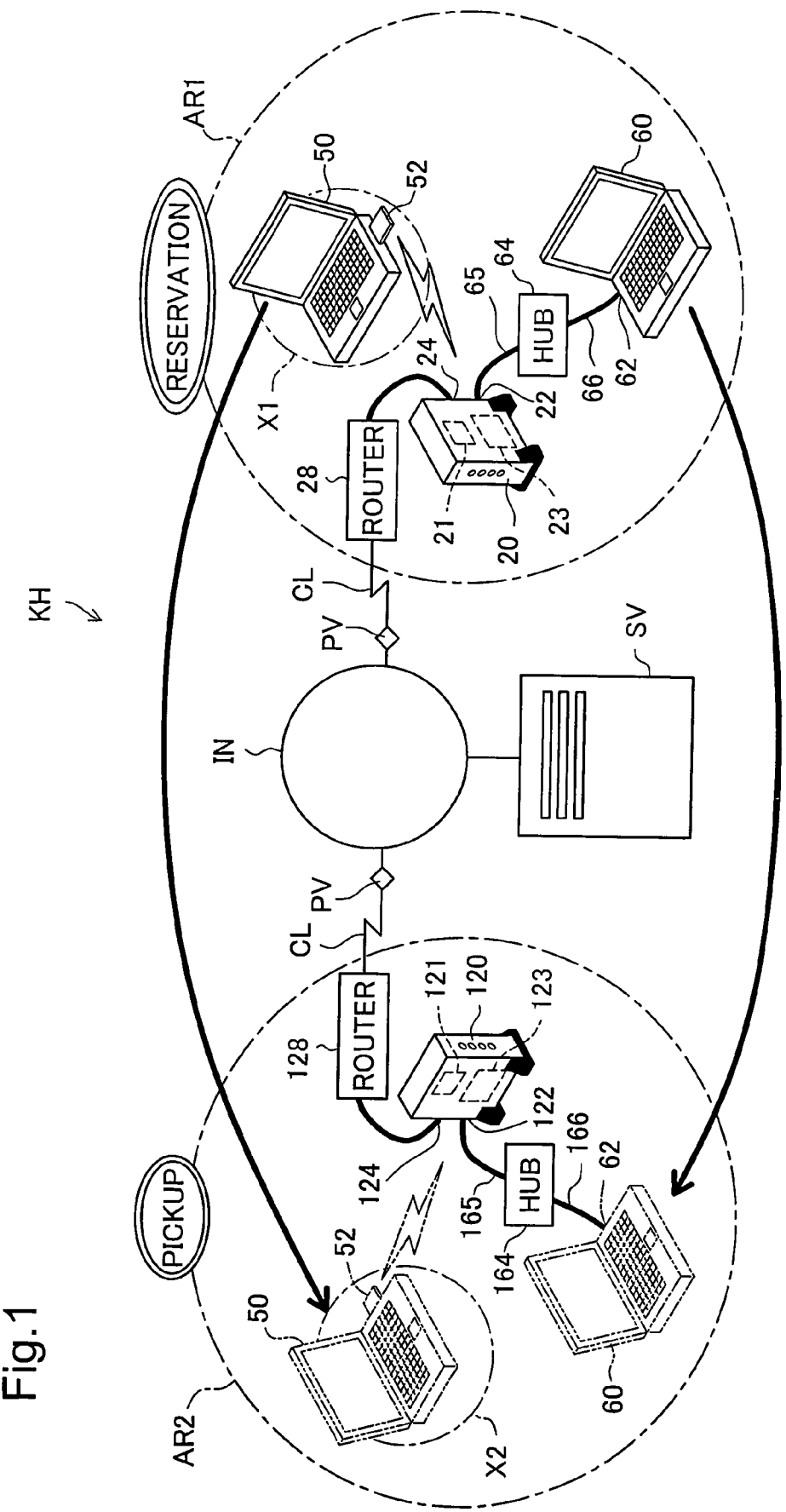
FIG. 1 shows the outline of a Web content reservation and pickup system in one embodiment of the present invention.

FIG. 1 shows the outline of a Web content reservation and pickup system KH (hereafter referred to as reservation-pickup system KH) in one embodiment of the present invention. The reservation-pickup system KH reserves acquisition of a selected content at a spot X1 (for example, at a railway station in Yokohama city) and picks up the reserved content at another spot X2 (for example, at a hotel in Osaka city), which is apart from the spot X1. The content may be a text, an image, a sound, a moving picture, or a combination thereof. The content selected for pickup may be a Web content located on a Web server as an object of transfer, a file received via a network according to a protocol like an FTP, or manually transferred data. In this embodiment, the content is a Web content on a server connecting with the Internet IN. The embodiment regards a technique of acquiring the Web content via the Internet IN.

As shown in FIG. 1, an access point (radio base station) 20 working as a radio relay station for a wireless LAN is located in a first communication area AR1, which covers the spot X1. The access point 20 is the radio relay station in conformity with the IEEE802.11b standard and has a maximum baud rate of 11 Mbps. The access point 20 is constructed to transmit and receive radio wave having a frequency of 2.4 GHz. In the system of FIG. 1, the first communication area AR1 represents a coverage of radio wave transmitted from the access point 20 (radio communication area). Setting the access point 20 constructs a wireless LAN having the radio communication area equal to the first communication area AR1.

A terminal 50 or a computer entering the first communication area AR1 establishes wireless communication with the access point 20 via transmission of radio wave between a wireless LAN adapter 52 attached to the terminal 50 and the access point 20. The access point 20 and the wireless LAN adapter 52 are capable of freely converting the data format from a computer processible format to a radio wave format and vice versa. This allows for off-line (in the state of no connection with the Internet) data transmission between the terminal 50 and the access point 20.

A hub 64 functioning as a cable allotter of a wired LAN is connected to a LAN port 22 of the access point 20 via an Ethernet (registered trademark) cable 65. Connection of the hub 64 with the access point 20 establishes a first LAN, which is the fusion of the wireless LAN and the wired LAN, in the first communication area AR1.

A terminal 60 or a computer with an adapter 62 in conformity with the Ethernet standard establishes wired communication with the access point 20 via Ethernet cables 65 and 66 by connecting the adapter 62 with a port of the hub 64 located in the first communication area AR1 via the Ethernet cable 66. This allows for off-line data transmission between the terminal 60 and the access point 20.

In the illustration of FIG. 1, the terminal 50 and 60 are book-type personal computers. This is, however, not restrictive at all, and a personal digital assistant, a portable computer, or any other equivalent device is applicable for each of the terminals 50 and 60.

As shown in FIG. 1, a router 28 with a built-in modem is connected to a WAN port 24 of the access point 20 via a cable. The router 28 identifies the terminal 50 or 60 in the first LAN, based on an identification number (MAC address) intrinsic to the adaptor 52 or 62 attached to each terminal 50 or 60.

The built-in modem of the router 28 is connected to the Internet IN via a broadband communication line CL, such as a CATV line or an xDSL line, and an exclusive line of a provider PV. The router 28 accordingly functions as a gateway to connect the first LAN with the Internet IN. This enables each of the general public in the first communication area AR1 to connect the own terminal to the Internet IN via the access point 20 and acquire various contents stored in a Web server SV on the Internet IN. Namely the first communication area AR1 works as the free spot described previously.

An access point 120, which has the structure similar to that of the access point 20, is located in a second communication area AR2, which covers the spot X2. A router 128, a hub 164, and Ethernet cables 166 and 165 connecting with the access point 120 directly or indirectly have the structures similar to those of the router 28, the hub 63, and the Ethernet cables 66 and 65 discussed above. As n the first communication area AR1, a second LAN, which is the fusion of a wireless LAN and a wired LAN, is accordingly established in the second communication area AR2. In the illustration of FIG. 1, the terminals 50 and 60, the wireless LAN adapters 52, and the adapter 62 in the second communication area AR2 are shown by the two-dot chain line. This shows that the terminals 50 and 60 in the first communication area AR1 move to the second communication area AR2.

As in the case of the access point 20, a WAN port 124 of the access point 120 is connected to the Internet IN via the router 128, a communication line CL, and an exclusive line of a provider PV. The router 128 accordingly functions as a gateway to connect the second LAN with the Internet IN. This enables each of the general public in the second communication area AR2 to connect the own terminal to the Internet IN via the access point 120 and acquire various contents stored in a Web server SV on the Internet IN. Namely the second communication area AR2 works as the free spot described previously.

The router 128 in the second LAN 128 is linked with the router 28 in the first LAN via the Internet IN. This allows for on-line (in the state of connection with the Internet) data transmission between the access point 120 and the access point 20.

The access point 20 has a controller 21 including a CPU, a ROM, and a RAM and a memory device 23 for storing data therein. The controller 21 executes various series of processing that relate to off-line data transmission in the first LAN and on-line data transmission to and from the access point 120. The memory device 23 stores the results of the processing executed by the controller 21 as data. The access point 120 has a controller 121 and a memory device 123, which have the same functions as those of the controller 21 and the memory device 23.

The controller 121 executes various series of processing that relate to off-line data transmission in the second LAN and on-line data transmission to and from the access point 20. The memory device 123 stores the results of the processing executed by the controller 121 as data. The controller 21 or 121 and the memory device 23 or 123 may not be built in the access point 20 or 120, but may be connected to the access point 20 or 120 by air or by a cable. For example, an external memory device 23 or 123 may be linked with the access point 20 or 120 via a cable or the like.

A-2. Series of Processing Executed by Access Points 20 and 120

The details of the characteristic processing executed by the controllers 21 and 121 in the access points 20 and 120 are discussed below with reference to FIG. 2.

The user of the terminal 50 or 60 in the first communication area AR1 operates the terminal 50 or 60 and inputs information for identifying a selected Web content for pickup (hereafter referred to as content identification information) and information for specifying a location outside the first communication area AR1 as a pickup location of the Web content (hereafter referred to as location specification information) into the terminal 50 or 60. The terminal 50 or 60 encrypts the input content identification information and location specification information with WEP (wired equivalent privacy) keys and transmits the encrypted content identification information and location specification information to the access point 20 via the first LAN. In this embodiment, the terminal 50 at the spot X1 (for example, AA railway station in Yokohama city) in the first communication area AR1 transmits the 'URL (uniform resource locator) of the selected Web content' as the content identification information and the 'name of the second spot X2' (for example, BB hotel in Osaka city) as the location specification information to the access point 20.

When the access point 20 receives the content identification information and the location specification information, the controller 21 issues an ID and a password inherent to the content identification information and the location specification information, encrypts the ID and the password with WEP keys, and transmits the encrypted ID and password to the terminal 50 or 60. The ID and the password are used as information for identifying a receiver who picks up the Web content (hereafter referred to as receiver identification information). Information other than the ID and the password, for example, the MAC address of the adapter 52 or 62 attached to the terminal 50 or 60, may be used to identify the receiver who picks up the Web content.

After the issuance of the receiver identification information, (1) the controller 21 maps the received content identification information and location specification information to the receiver identification information and inputs the mapped information (information input process). This process accepts reservation for acquiring a Web content selected by the user of the terminal 50 or 60.

A series of processing is subsequently executed to provide the user of the terminal 50 or 60 with the reserved Web content. (2) The controller 21 first refers to an area map and specifies an access point of providing the terminal 50 or 60 with the reserved content (hereafter referred to as pickup access point), based on the input location specification information (pickup point specification process). The area map represents geographical information showing radio communication areas as free spots in various regions and access points covering the radio communication areas. When the name of the spot X2 'BB hotel in Osaka city' is input as the location specification information, the controller 21 specifies the location of the BB hotel on the area map and then specifies a radio communication area including the BB hotel and an access point covering the radio communication area. In this embodiment, the BB hotel is located in the second communication area AR2 of the access point 120, and the pickup access point is specified as '120', which is the code number allocated to the access point 120.

(3) The controller 21 subsequently maps the input receiver identification information to the content identification information, encrypts the mapped information with WEP keys, and transmits the encrypted information via the Internet IN to the access point 120 specified as the pickup access point (transmission process).

(4) When the access point 120 receives the receiver identification information and the content identification information, the controller 121 inputs and stores the receiver identification information and the content identification information into a storage table MA in the memory device 123 (identification information input and storage process). Each Web content to be provided to the user of the terminal 50 or 60 by the access point 120 is mapped to the receiver identification information and is written in the storage table MA. In the example of FIG. 2, the input receiver identification information (ID: Tokyo, password: ***) is mapped to the input content identification information (http://www . . . . . . .) and is recorded in an identification information column of the storage table MA.

(5) The controller 121 subsequently gains access to the Web server SV on the Internet IN, based on the URL as the content identification information, and fetches a content A corresponding to the URL (content fetch process). (6) The controller 121 then stores data representing the details of the fetched content A into a data column of the storage table MA corresponding to the URL (content storage process). These steps acquire the Web content reserved by the user of the terminal 50 or 60 and store the data representing the details of the acquired Web content as mapped to the receiver identification information.

The series of processing (2) through (6) (pickup point specification process, transmission process, identification information input and storage process, content fetch process, and content storage process) is executed immediately after conclusion of the information input process by the controller 21. The processing is accordingly completed before the user of the terminal 50 or 60 who has reserved a desired Web content at the spot X1 reaches the spot X2. The controller 121 waits for pickup of the data representing the Web content A by the user of the terminal 50 or 60.

(7) When the user of the terminal 50 or 60 moves from the spot X1 to the spot X2, the terminal 50 or 60 enters the second communication area AR2. In response to an access from the terminal 50 or 60 to the access point 120 for pickup of the reserved Web content, (8) the controller 121 requests the terminal 50 or 60 to input of the receiver identification information (ID and password) issued at the time of reservation of the Web content (receiver identification information input process). (9) The controller 121 inputs the ID and the password encrypted with the WEP keys and transmitted from the controller 21, and authenticates the access when the input ID and password are identical with the ID and the password stored in the storage table MA (receiver authentication process). (10) only when the access is authenticated, the controller 121 refers to the storage table MA, encrypts the data, which represent the details of the Web content and have been stored as mapped to the ID and the password, with WEP keys, and transmits the encrypted data to the terminal 50 or 60 (content transmission process). In the example of FIG. 2, only in response to input of the ID 'tokkyo' and the password '***', the data representing the details of the Web content A are transmitted to the terminal 50 or 60.

A-3. Functions and Effects

The user of the terminal 50 or 60 located in one free spot (first communication area AR1) is planned to move to another free spot (second communication area AR2). In the Web content reservation and pickup system KH of the embodiment discussed above, prior to the movement, the user of the terminal 50 or 60 gains off-line (in the state of no connection with the Internet) access to the access point 20 in one free spot to reserve acquisition of a desired Web content. After the reservation, the access point 120 gains on-line (in the state of connection with the Internet) access to the Web server to automatically acquire the reserved web content. The user picks up the reserved Web content through an off-line access to the access point 120 in another free spot after the movement. This enables the user to pick up a desired Web content at a desired location in a short download time, regardless of the traffic of the line. The pickup is allowed under the condition of the authentication based on the receiver identification information issued or input at the time of reservation. This arrangement effectively prevents the reserved Web content for pickup from being accessed illegally by any third person and ensures the sufficient security.

In the system of the above embodiment, the access point 120, which provides the user of the terminal with the reserved Web content after movement, executes the content fetch process. There is accordingly no necessity of transmitting data representing the details of the reserved Web content from the access point 20 to the access point 120. This desirably reduces the traffic of the exclusive line for the Internet.

B. Modified Examples

Figure 3:
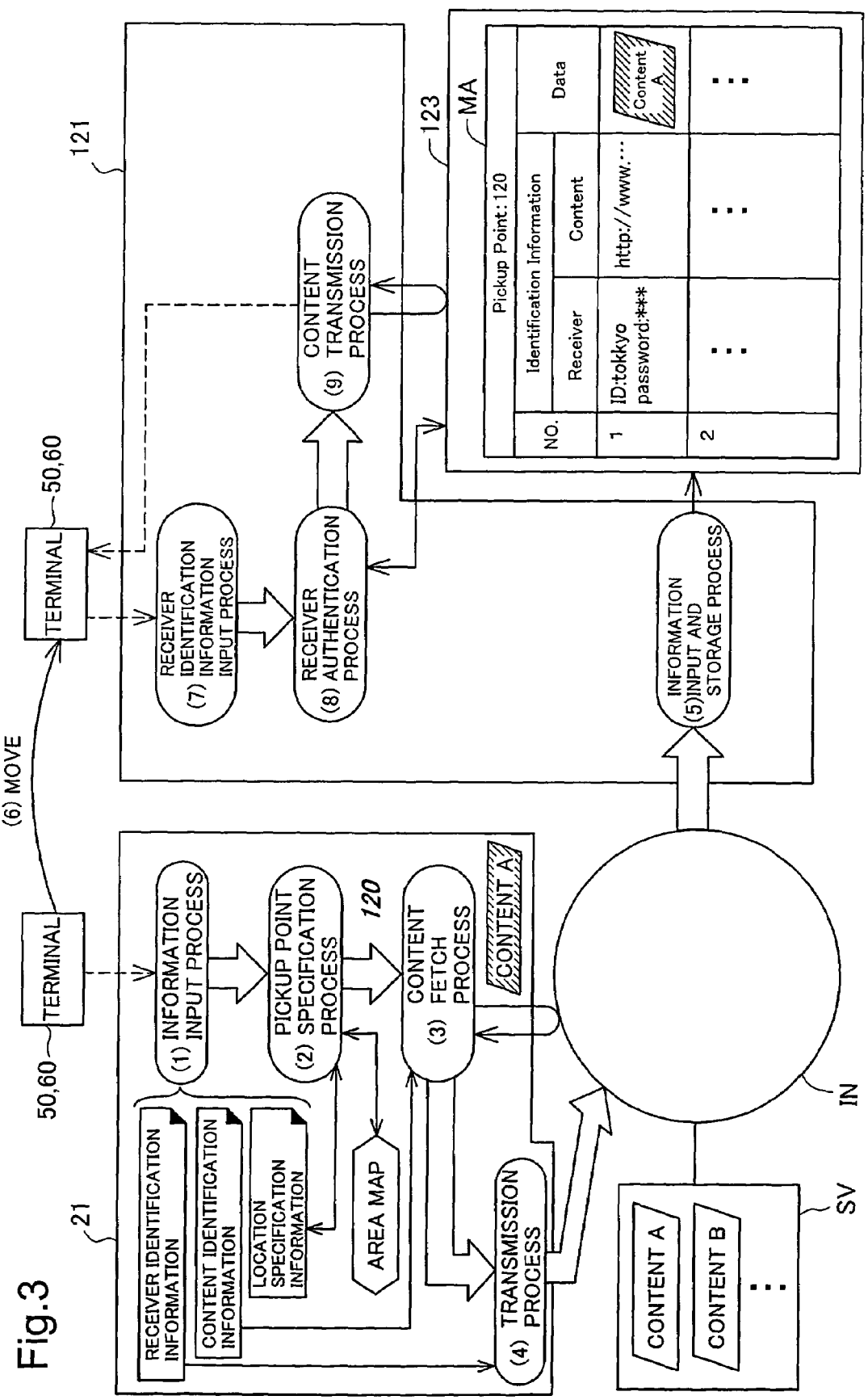
FIG. 3 shows a first modified example.

In the system of the above embodiment, the access point 120, which provides the user of the terminal with the reserved Web content after movement, executes the content fetch process. The content fetch process may, however, be executed by a device connectable to the Internet IN, other than the access point 120. FIG. 3 shows a first modified example, where the access point 20, which accepts reservation of a desired Web content by the user of the terminal prior to the movement, executes the content fetch process. In this modified system, (3) the controller 21 of the access point 20 gains access to the Web server SV on the Internet IN based on the URL as the content identification information and fetches the content A corresponding to the URL (content fetch process). (4) The controller 21 subsequently maps data of the fetched content A to the input receiver identification information and content identification information, and transmits the mapped data to the access point 120 via the Internet IN (transmission process).

In the system of the above embodiment, the user operates the own terminal 50 or 60 to input the content identification information for identifying a desired content into the terminal 50 or 60. In one possible modification, the user does not input the content identification information but inputs only the location specification information. The access point 20 inputs the location specification information and the receiver identification information and sets a storage space for data, which are acquired via the Internet IN, in the memory device 123. This configuration is shown in FIG. 4 as a second modified example.

In the system of the second embodiment, the user of the terminal 50 or 60 is not required to give an instruction regarding the details of the desired data to the access point 20. In response to specification of the pickup location and identification of the receiver who picks up data, the access point 120 executes a storage space setting process to set a storage space for each user's data (an area filled with downward-sloping hatched lines in FIG. 4) in the storage table MA in the memory device 123 connecting with the access point 120. Although not being specifically shown in FIG. 4, when the storage space is set in the memory device 123, a management number is allocated to the storage space (hereafter referred to as space management number). The controller 21 of the access point 20 transmits the space management number allocated to the storage space to the terminal 50 or 60.

After setting the storage space, while the user of the terminal 50 or 60 moves, an arbitrary access point 220 gains access to the access point 120 via the Internet IN to fetch data stored in a server SV1 (may be or may not be Web server) on the Internet IN. The fetched data are then stored in the storage space. The user of the terminal 50 or 60 gains off-line access to the access point 120 after the movement to pick up the data stored in the storage space.

Figure 2:
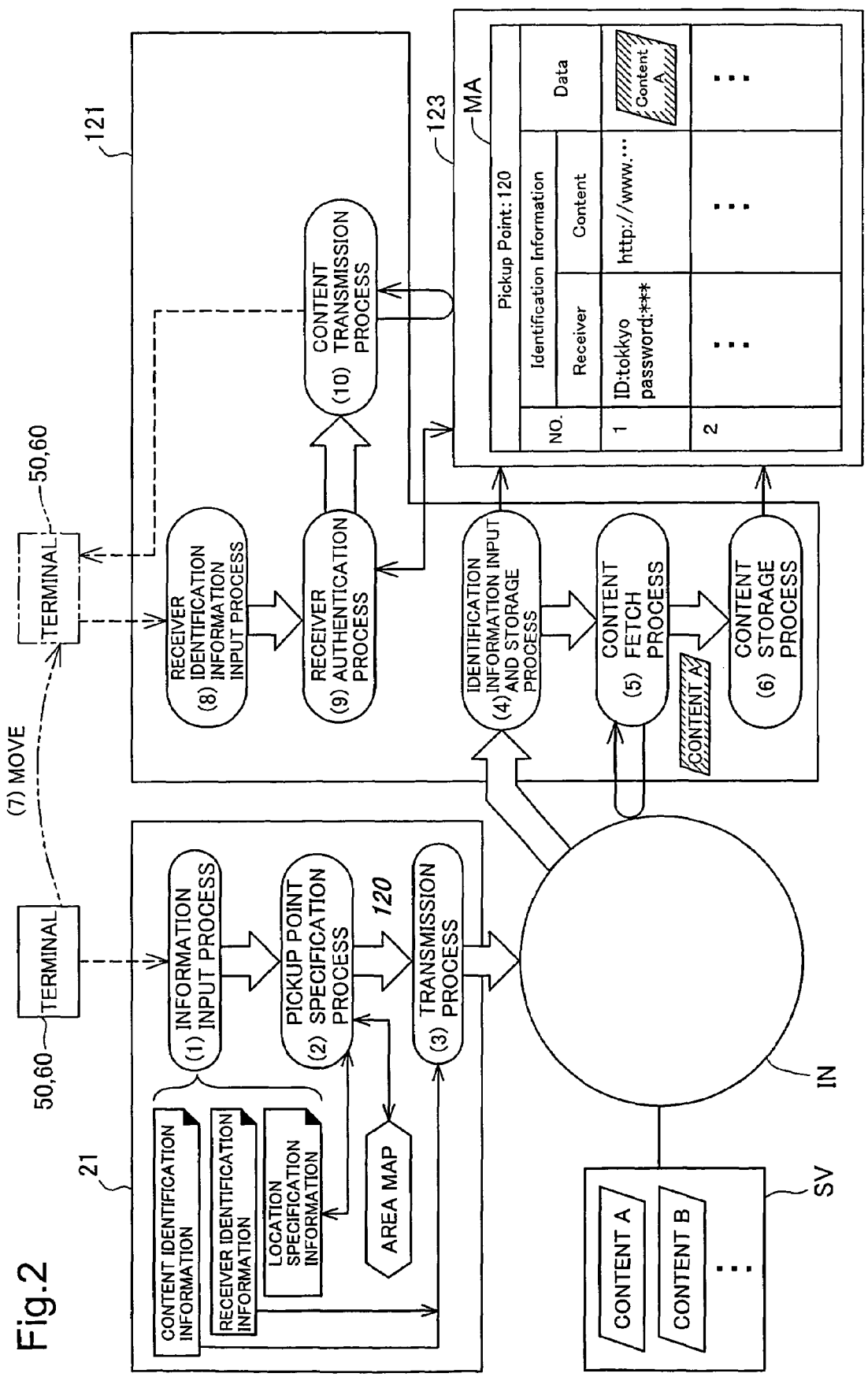
FIG. 2 shows series of processing executed by controllers of access points in the Web content reservation and pickup system of FIG. 1.
Figure 4:
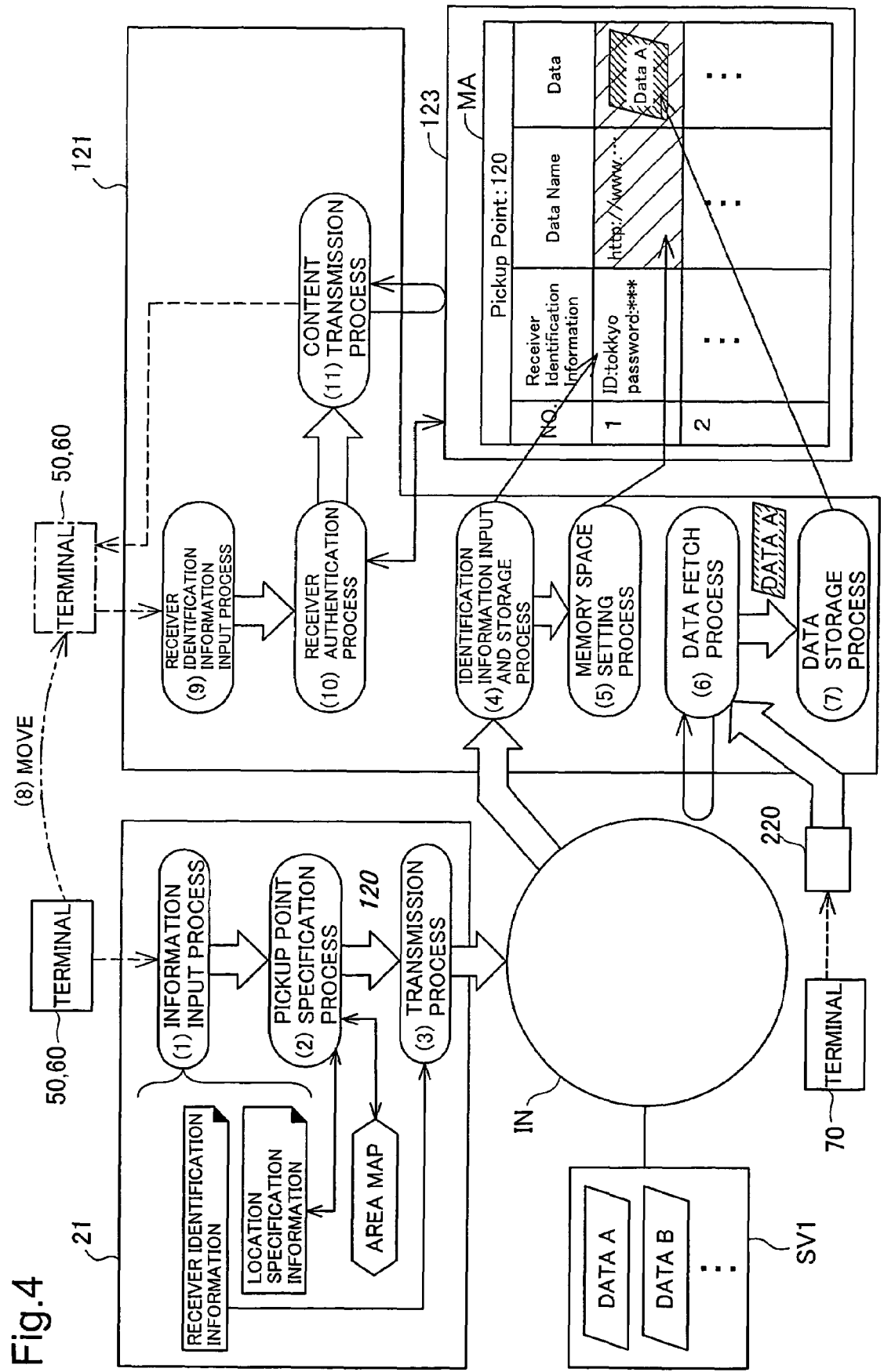
FIG. 4 shows a second modified example.

Although not being specifically shown in FIG. 4, prior to fetch of data from the server SV1, a controller in the access point 220 executes, in response to an instruction from the terminal, either an authentication process with the password and the ID in a similar manner to the process (8) and (9) shown in FIG. 2 or an authentication process with the space management number. The former authentication process is carried out, when the password and the ID are transmitted from the terminal to the access point 220. The latter authentication process is carried out, when the space management number is transmitted from the terminal to the access point 220. On completion of the former authentication, the access point regards the access as an access from the legal user of the terminal and allows the terminal to write acquired data into the storage space and read data stored in the storage space. On completion of the latter authentication, on the other hand, the access point regards the access as an access from a representative of the legal user of the terminal and allows the terminal to write acquired data into the storage space but forbids the terminal to read data stored in the storage space.

For example, it is assumed that a director of a certain office who is the user of the terminal 50 or 60 can not specify the details of desired data at the spot X1 prior to a movement. When the director specifies a pickup location of the desired data and transmits the location specification information to the access point 20, the access point 20 issues an ID, a password, and a space management number. A storage space for the director is then set in the access point 120, to which the director moves. The director then informs a secretary of 'the presence of the storage space set in the access point 120', 'the space management number allocated to the storage space', and 'the instruction of storing data required for a tomorrow's meeting into the storage space'. The secretary searches for the required data and gains access from a terminal 70 to the access point 220 with the space management number to write the required data into the storage space, for example, according to a procedure of file transfer via the Internet. After the movement, the director downloads the required data through an off-line access to the access point 120. The secretary who uses the space management number for the access can not access the data stored in the storage space. This arrangement desirably keeps the director's privacy. In this structure, the data may be transmitted via an exclusive line, instead of the Internet. This attains the higher security level than that of the Internet open to the general public. A virtual private network (VPN) established on a network, such as the Internet, maybe utilized for the data transfer. Diverse protocols, such as HTTP, FTP, and TELNET used in the Internet, are applicable for the data transfer. In the case of a network other than the Internet, any protocol usable on the network is applicable for the data transfer.

The above embodiment and its modified examples are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The embodiment and its modified examples discussed above use the ID and the password for authentication and determine whether or not a person who has reserved a Web content is identical with a person who is going to pick up the reserved Web content. Information for identifying a terminal that picks up the reserved Web content (for example, a MAC (media access control) address as an ID number intrinsic to the wireless LAN adapter 52 or the adapter 62) may be used for the authentication, instead of the ID and the password. This modified system changes (1) the information input process, (3) the transmission process, (4) the identification information input and storage process, (8) the receiver identification information input process, and (9) the receiver authentication process shown in FIG. 2 to the processes discussed below.

(1) When the access point 20 receives the content identification information and the location specification information from the terminal 50 or 60, the controller 21 reads and inputs the MAC address of the wireless LAN adapter 52 or the adapter 62 based on the received information. (3) The controller 21 maps the MAC address to the content identification information and sends the mapped information to the access point 120 via the Internet IN. (4) When the access point 120 receives the MAC address and the content identification information, the controller 121 inputs and stores the MAC address and the content identification information into the storage table MA in the memory device 123. (8) In response to an access for pickup of the reserved Web content from the terminal 50 or 60 to the access point 120, the controller 121 reads the MAC address of the wireless LAN adapter 52 or the adapter 62 and (9) authenticates the access when the read MAC address is identical with the MAC address stored in the storage table MA.

This arrangement enables the terminal 50 or 60 used for the reservation to pick up data representing the details of the Web content and thereby ensures consolidation of data management. This arrangement also saves the labor of the user. The user of the terminal 50 or 60 is not required to input the ID and the password through operations of the terminal 50- or 60 at the time of reservation and at the time of data pickup.

In the above embodiment, the geographic names in Japan are used as the example of the spot X1 in the first communication area AR1 and the spot X2 in the second communication area AR2. The Internet IN is the worldwide network mutually connecting a large number of computer networks all over the world via exclusive lines. The spots X1 and X2 may thus be any two different places in any state or country or any two different places in any two different states and countries. Namely the user can reserve a desired content at a free spot in one country, for example, Japan, and pick up the reserved content at a free spot in another country, for example, the USA.

What is claimed is:

1. A content reservation and pickup system, where multiple access points as radio relay stations for a wireless LAN are located at multiple spots that are mutually apart from each other, and a radio communication area of each access point is established in a coverage of radio wave transmitted from the access point, in said content reservation and pickup system, when a terminal enters a radio communication area of a first access point which is one of said multiple access points, said terminal gains access to said first access point to reserve acquisition of a selected content via the Internet, after the reservation, said terminal gains access to said second access point to pick up the reserved selected content, said first access point comprising:
an input module that inputs content identification information for identifying the selected content for pickup, location specification information for specifying a location outside the radio communication area of said first access point as a pickup location of the selected content, and receiver identification information for identifying a person who picks up the selected content, through an access from said terminal entering the radio communication area of first access point;

a specification module that retrieves a radio communication area including the location specified by the input location specification information and specifies an access point that covers the retrieved radio communication area as an second access point; and an information transmission module that maps the input receiver identification information to information on the selected content for pickup and transmits the mapped information to said specified second access point via the Internet, said second access point comprising:

a storage module that stores the selected content for pickup, which is acquired through an access to a Web server on the Internet based on the content identification information and is mapped to the receiver identification information;

an authentication module that requests input of the receiver identification information in response to an access from any terminal, and authenticates the access when the input receiver identification information is identical with the stored receiver identification information; and a content transmission module that transmits the selected content, which is stored as mapped to the receiver identification information, to said terminal authenticated by said authentication module.

2. A content reservation and pickup system in accordance with claim 1, wherein said information transmission module transmits the content identification information as the information on the selected content for pickup, and said second access point further comprising:

a content fetch module that gains access to the Web server connecting with the Internet based on the input content identification information, and fetches the selected content for pickup prior to a movement of said authenticated terminal into the radio communication area of said second access point.

3. A content reservation and pickup system in accordance with claim 2, wherein said input module inputs hardware inherent information for identifying said terminal that picks up the content, instead of the receiver identification information.

4. A content reservation and pickup system in accordance with claim 1, wherein said input module inputs hardware inherent information for identifying said terminal that picks up the content, instead of the receiver identification information.

5. An access point as a radio relay station for a wireless LAN that transmits radio wave of a predetermined frequency and, when a terminal enters a radio communication area established in a coverage of the transmitted radio wave, connects said terminal to the Internet in response to a predetermined instruction from said terminal, said access point comprising:

an input module that inputs content identification information for identifying the selected content for pickup, location specification information for specifying a location outside the radio communication area of said access point as a pickup location of the selected content, and receiver identification information for identifying a receiver who picks up the selected content, through an access from said terminal entering the radio communication area;

an information transmission module that accepts reservation of the selected content for pickup in response to input by said input module, and transmits the input content identification information and receiver identification information to another access point via the Internet;

an acquisition module that, in response to input of the content identification information and the receiver identification information transmitted from another access point, gains access to a Web server on the Internet to acquire the reserved content for pickup based on the input content identification information;

a storage module that stores the acquired content, which is mapped to the receiver identification information;

an authentication module that requests input of the receiver identification information in response to an access from any terminal entering the radio communication area, and authenticates the access when the input receiver identification information is identical with the stored receiver identification information; and a content transmission module that transmits the selected content, which is stored as mapped to the receiver identification information, to said terminal authenticated by said authentication module.

6. A content reservation and pickup method comprising the steps of:

providing multiple access points as radio relay stations for a wireless LAN at first spot and second spot that are mutually apart from each other, a first radio communication area which is a coverage of radio wave transmitted from a first access point located at the first spot, and a second radio communication area which is a coverage of radio wave transmitted from second access point located at the second spot;

allowing access from a terminal entering the first radio communication area to said first access point, so as to input content identification information for identifying the selected content for pickup, location specification information for specifying a location in the second radio communication area as a pickup location of the selected content, and receiver identification information for identifying a person who picks up the selected content;

causing either of said first access point and said second access point to gain access to a Web server on the Internet and acquire the selected content for pickup, based on the input content identification information;

causing said second access point to store the acquired content, which is mapped to the receiver identification information;

requesting input of the receiver identification information in response to an access from any terminal entering the second radio communication area to said second access point after the storage, and authenticating the access when the input receiver identification information is identical with the stored receiver identification information; and transmitting the selected content, which is stored as mapped to the receiver identification information, to said authenticated terminal.

7. A data pickup system, where multiple access points as radio relay stations for a wireless LAN are located at multiple spots that are mutually apart from each other, and a radio communication area of each access point is established in a coverage of radio wave transmitted from the access point, in said data pickup system, when a terminal enters a radio communication area of one access point, said terminal gains access to said access point to set a storage space for data acquired via a communication line, in a memory device connecting with another access point, which is different from said one access point, said one access point comprising:

an input module that inputs location specification information for specifying a location outside the radio communication area of said one access point as a pickup location of the data and receiver identification information for identifying a person who picks up the data, through an access from said terminal entering the radio communication area of said one access point;

a specification module that retrieves a radio communication area including the location specified by the input location specification information and specifies an access point that covers the retrieved radio communication area as an second access point; and an information transmission module that transmits the input receiver identification information to said specified second access point, said second access point comprising:

a storage space setting module that sets a storage space to store the receiver identification information and data mapped to the receiver identification information and acquired via the communication line, in a memory device connecting with said second access point;

an authentication module that requests input of the receiver identification information in response to an access from any terminal, and authenticates the access when the input receiver identification information is identical with the stored receiver identification information; and a data transmission module that transmits the data, which is stored in the storage space as mapped to the receiver identification information, to said terminal authenticated by said authentication module, whereby said authenticated terminal which enters said radio communication area of said second access point after the setting, picks up the data stored in the storage space.

8. A data pickup system in accordance with claim 7, wherein the communication line is any one of an exclusive communication line, the Internet, and a closed net virtually formed on a network like the Internet.

* * * * *